Sept. 2, 1952  D. KIRK  2,608,918
APPARATUS FOR INSERTING CLOSURES IN CONTAINERS
Filed Oct. 20, 1948  6 Sheets-Sheet 1

INVENTOR.
Douglas Kirk
BY
Ely & Frye
ATTORNEYS

Sept. 2, 1952          D. KIRK          2,608,918

APPARATUS FOR INSERTING CLOSURES IN CONTAINERS

Filed Oct. 20, 1948          6 Sheets-Sheet 2

INVENTOR.
Douglas Kirk
BY
ATTORNEYS

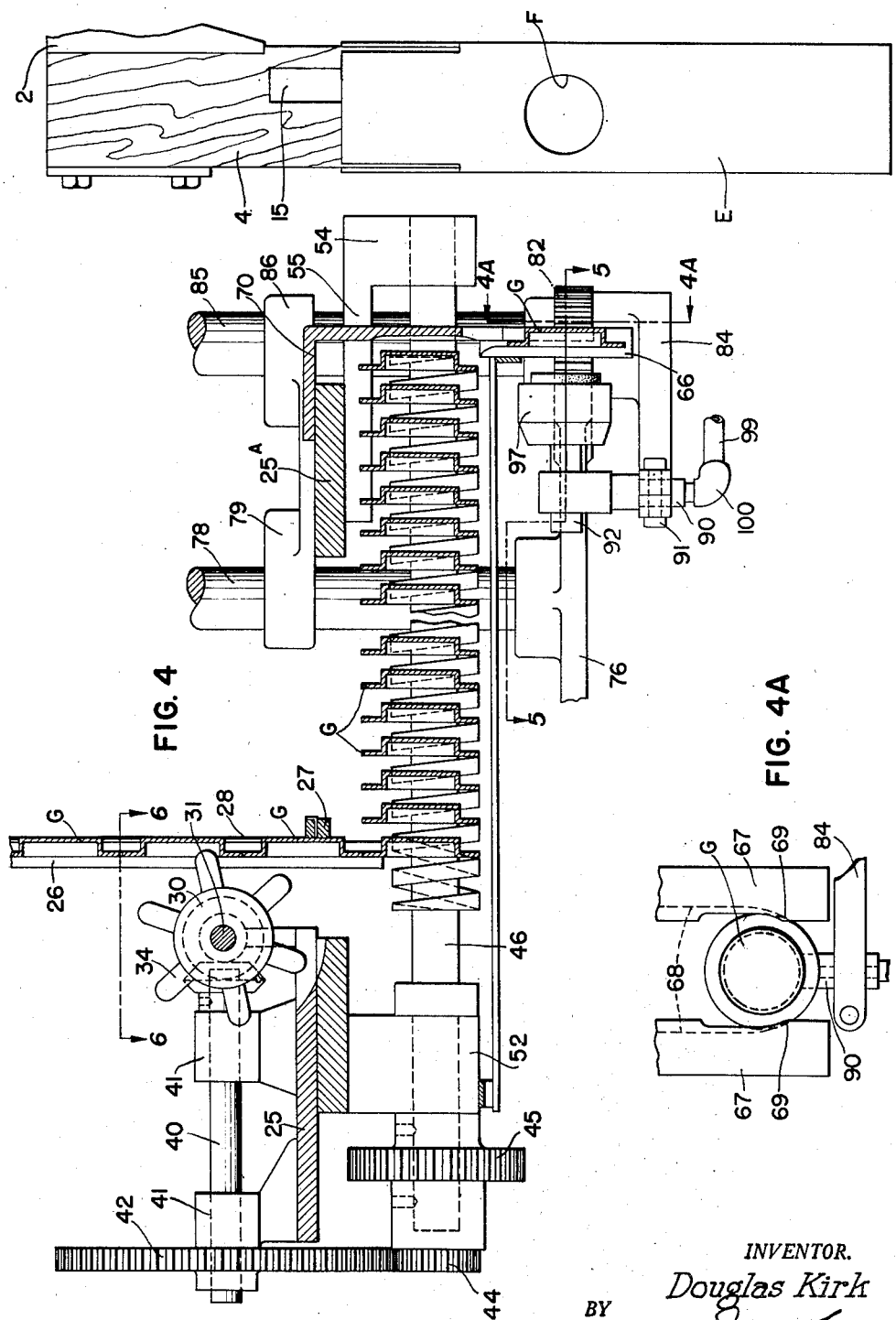

Sept. 2, 1952 D. KIRK 2,608,918
APPARATUS FOR INSERTING CLOSURES IN CONTAINERS
Filed Oct. 20, 1948 6 Sheets-Sheet 4
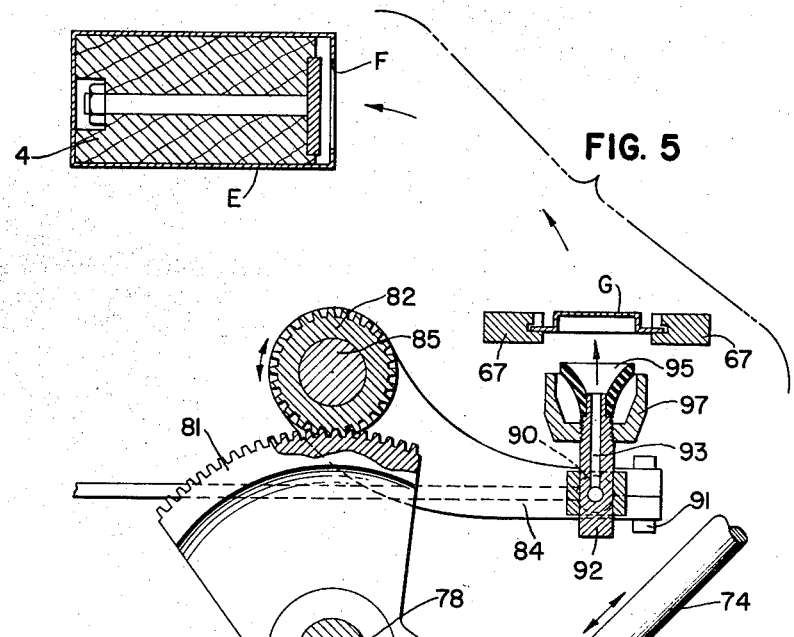
FIG. 5
FIG. 5A
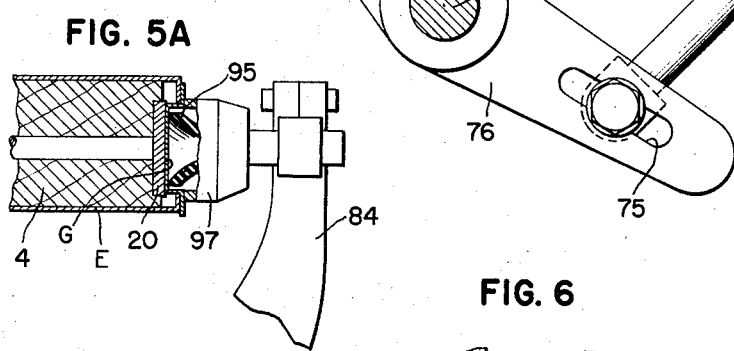
FIG. 6
INVENTOR.
Douglas Kirk
BY
ATTORNEYS

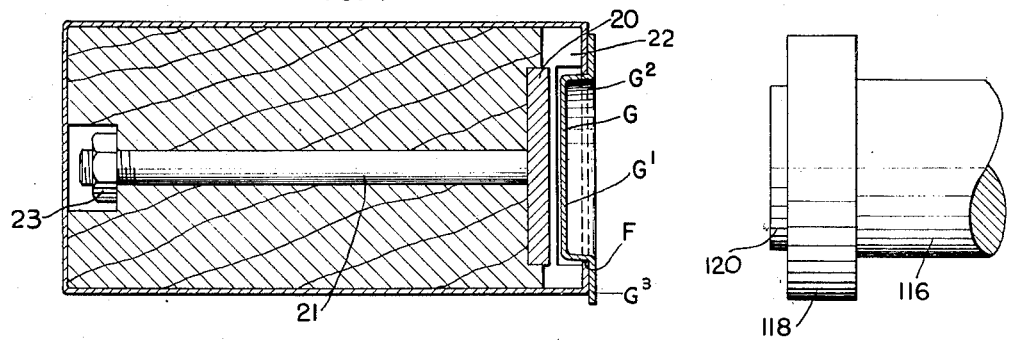
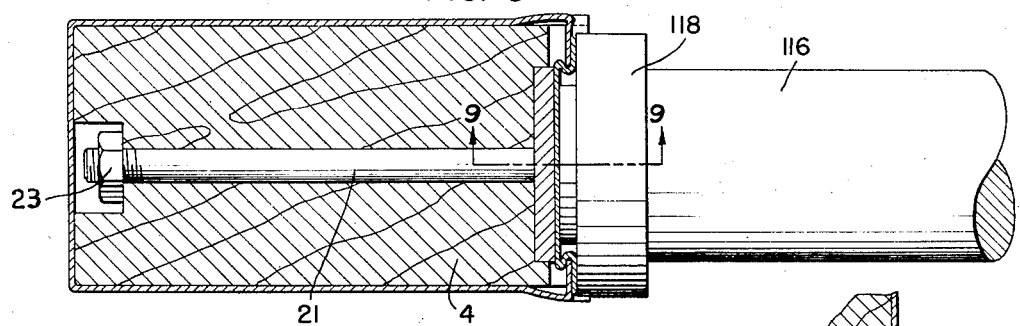
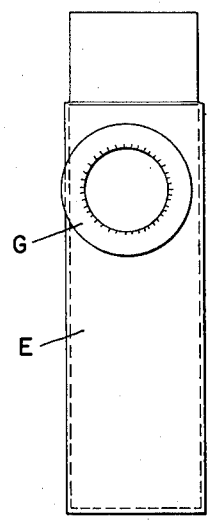
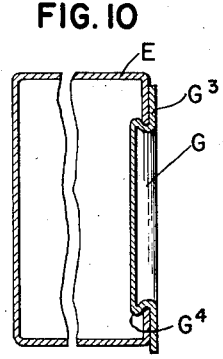
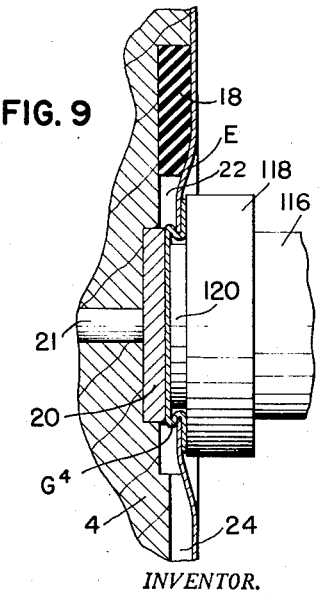

Sept. 2, 1952 D. KIRK 2,608,918
APPARATUS FOR INSERTING CLOSURES IN CONTAINERS
Filed Oct. 20, 1948 6 Sheets-Sheet 6
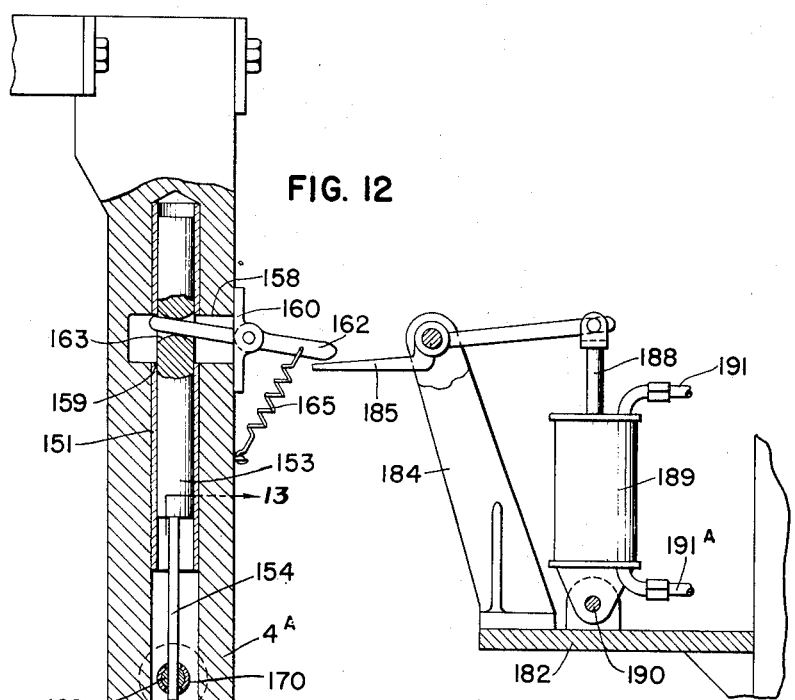
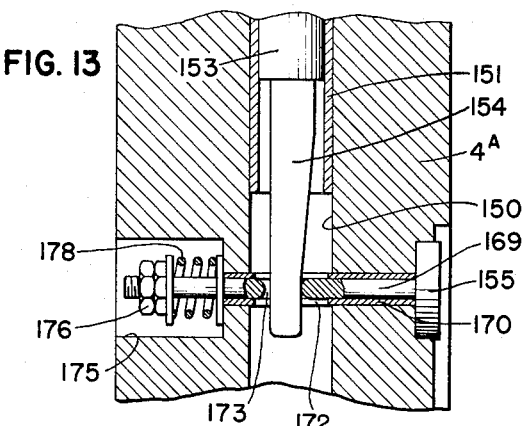
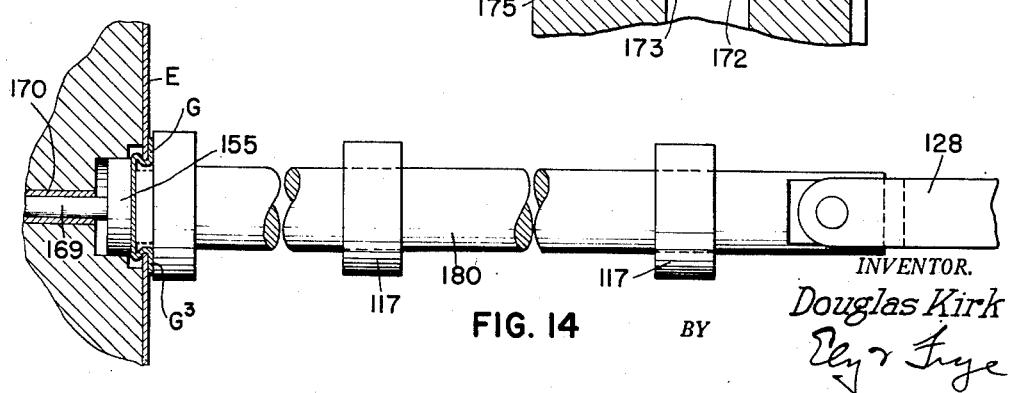
INVENTOR.
Douglas Kirk
BY Ely & Frye
ATTORNEYS Patented Sept. 2, 1952

2,608,918

UNITED STATES PATENT OFFICE 2,608,918

APPARATUS FOR INSERTING CLOSURES IN CONTAINERS

Douglas Kirk, Hudson, Ohio, assignor to The Quaker Oats Company, Chicago, Ill., a corporation of New Jersey Application October 20, 1948, Serial No. 55,472

10 Claims. (Cl. 93—55.1)

This invention relates to the art of manufacturing containers which are provided with caps or closures removably inserted in an opening in a wall of the container, and particularly to machines and methods for inserting the caps in the walls of the containers and deforming or upsetting the caps so that they are provided with beads which serve as releasable interlocks with the walls of the containers.

Caps of the type with which this invention deals are well known in the art. Such a cap is formed from a relatively heavy paper stock, usually straw board or chip board, having an outer rim and a depressed central portion to form a cup-like protrusion which fits in an opening in a wall of the container which is also usually made of a similar paper stock. The wall surrounding the cup portion of the cap is originally formed at right angles to the plane of the cap or with a slight outward taper, and to provide for an interlock with the container the wall of the cup-shaped portion is mushroomed so as to provide a bead which is somewhat greater in diameter than the diameter of the opening in the carton. This bead permits the cap to snap in and out of position in the container opening so that when the cap is in place it will not be accidentally displaced.

Caps of the type specified are used on all sorts of containers for liquids or solids and may be located in the top, a side wall or the bottom of the container. As a specific embodiment of the invention, this application shows the insertion of a cap of this type in one of the side walls and near the top of a six-sided container such as may be used for flour, sugar or other solid materials, but the invention is not limited to this particular use or location and may be employed in the manufacture of containers for any commodity and may be located at any point in the container.

The invention relates particularly to a mechanism for inserting the cap in the wall of the container and forming the bead thereon as steps in a continuous operation. It has been customary to make the cap with the bead thereon before inserting the cap in the container. By the use of the present invention the cap is inserted in position in the container before the interlocking bead is formed and then the cap is upset and the bead is formed while in position in the container.

It has also been proposed heretofore to insert the cap in the opening of the container and then to insert a forming tool or expanding chuck in the depression in the cap so as to form the bead. The present invention is a substantial improvement over these prior methods of forming the bead due to the simplicity of the operation and the machine elements which are employed for the upsetting operation. The method and mechanism employed has the further advantage that it may be used in conjunction with standard container-forming machines.

The invention, as illustrated herein, is shown as applied to a standard container-forming machine of a well known type in which a series of mandrels, usually four in number, are suspended from a rotary turntable which is moved step by step from a station where the mandrels receive the squared-up container blanks to stations where the end flaps at the bottoms of the containers are glued and folded in position to form the bottoms and then to a station where the containers are ejected by stripping them downwardly off the mandrels. In illustrating this invention, only those portions of the standard machine are shown which are necessary to an understanding of the present invention. It will be appreciated that with appropriate modifications, such as may be made by anyone skilled in the art, the invention may be incorporated in any other type of carton or container-forming machine.

The mechanism shown and described herein feeds the caps which are formed with vertical or slightly tapered walls about the depression in a line to a position adjacent that occupied by a mandrel after it has received the squared-up container which is provided with an opening in one of the walls to receive the cap. A transfer arm picks off the forward cap of the line and inserts it in the opening in the container. The next step in the operation of the machine moves the mandrel, now holding a container with the cap in place therein, to a position opposite a plunger or upsetting tool which, while the mandrel is stationary, advances toward the mandrel and delivers a sharp blow to the cap which upsets the cap against a rigid anvil set in the mandrel behind the opening in the container. This operation forms the bead that constitutes the interlock so that when the plunger withdraws the cap is held in place in the container.

The operation of upsetting or mushrooming the cap reduces somewhat the overall depth of the cap and it is necessary to provide for the inward deflection of the wall of the carton surrounding the cap receiving opening. For this purpose the mandrel is cut away in the region of the opening in the carton and is preferably provided with a yielding area which will give sufficiently to prevent injury to the wall of the container by the impact of the plunger.

After upsetting the cap, the plunger recedes and the mandrel moves to the next station where the container is stripped off the mandrel. To allow the container to be removed with the cap in place, a channel is provided which is extended to the base of the mandrel.

In the drawings and in the specification the preferred and best known embodiment of the machine is disclosed, but it will be understood that the disclosure is for the purpose of explaining the invention and that the invention is capable of reproduction with other forms of machines. Hence, the invention is not to be limited to the details which are given but may be modified and improved upon within the scope thereof as set forth in the appended claims.

In the drawings:

Fig. 4 is a vertical section through the cap feeding mechanism, the location of the view being indicated by the section line 4—4 on Fig. 2.

Fig. 4a is a view looking at the delivery end of the cap conveyor, the view being located on the line 4a—4a of Fig. 4.

Fig. 5 is a section on the line 5—5 of Fig. 4 showing the cap transfer arm.

Fig. 5a is a view showing the cap as it is placed in position by the transfer arm.

Fig. 6 is a section on the line 6—6 of Fig. 4.

Fig. 7 is a view showing the container just prior to the upsetting operation.

Fig. 8 is a view showing the container at the instant that the cap is upset.

Fig. 9 is a section on the line 9—9 of Fig. 8.

Fig. 10 is a vertical section through the container after it is stripped from a mandrel.

Fig. 11 is a side view of the container.

Fig. 12 is a view showing a modified mechanism for upsetting the cap, a portion of the modified mandrel being shown in section.

Fig. 13 is a section on the line 13—13 of Fig. 12.

Fig. 14 is a horizontal section through the lower part of the mandrel showing the upsetting operation.

The numeral 1 represents in outline the frame of the machine and the numeral 2 the turntable or wheel at the top of the machine from which are suspended the mandrels 4 about which the container is formed by appropriate mechanism known in this art and not shown herein as it has no direct bearing upon the invention.

Figure 1:
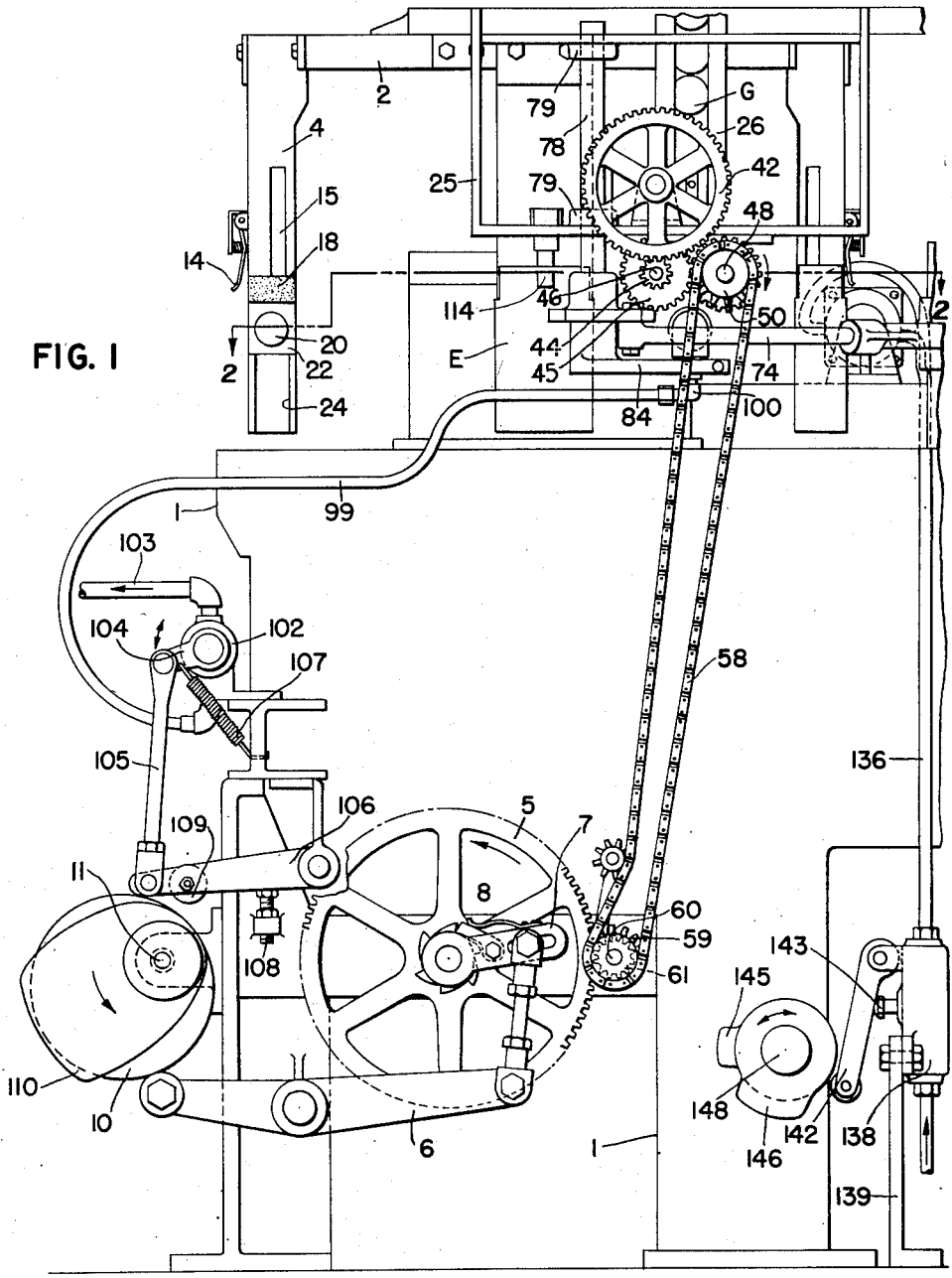
Fig. 1 is a side elevation showing certain of the operating mechanism which has been added to a standard container forming machine of the type hereinbefore described, only those parts of the standard machine which are essential to an understanding of the invention being shown.
Figures 2, 3:
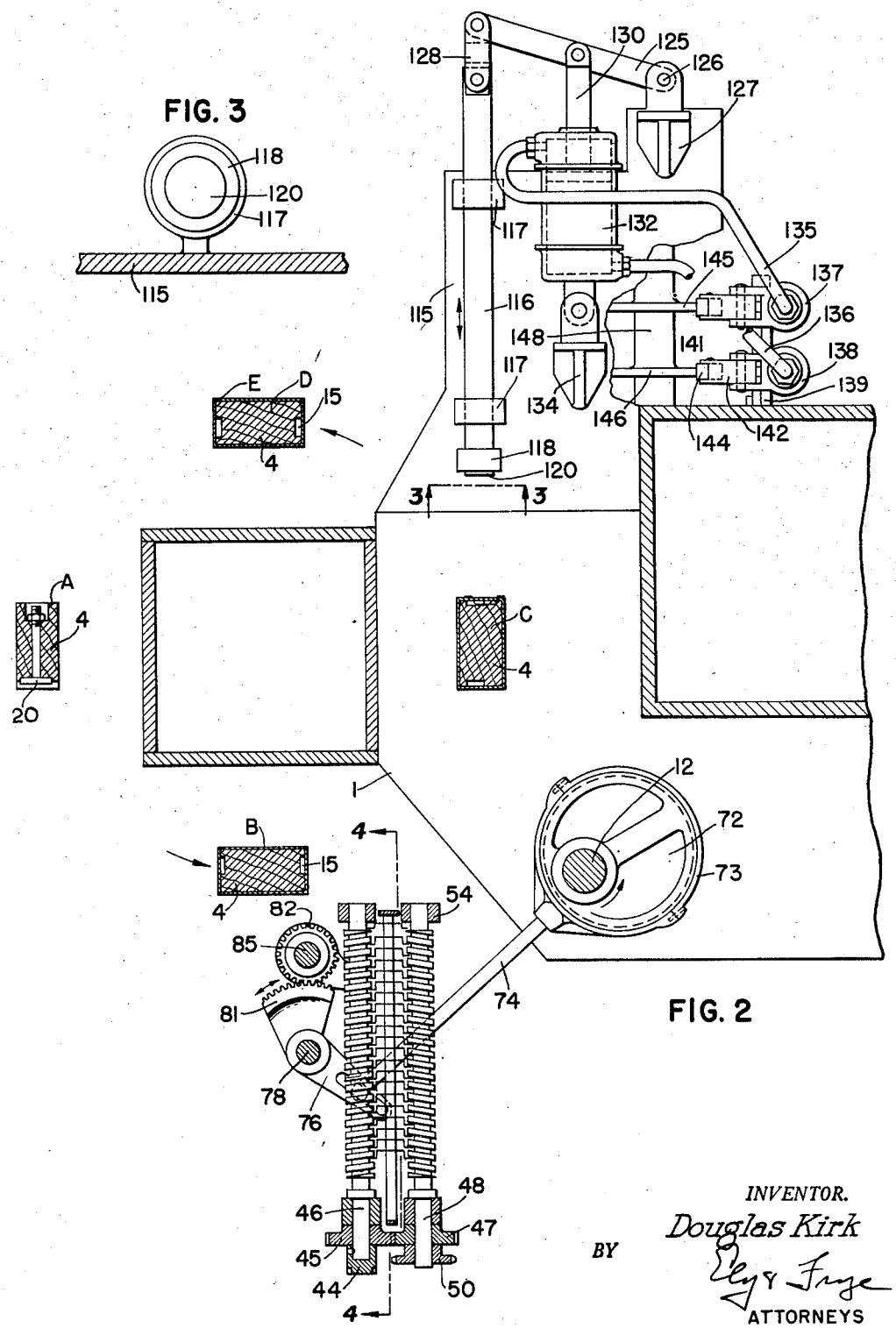
Fig. 2 is a horizontal section on the line 2—2 of Fig. 1 showing the four mandrels at their various stations, the cap feeding mechanism being located in the lower part of the view and the cap mushrooming or upsetting mechanism being shown at the top of the view.
Fig. 3 is a view looking at the head of the plunger which performs the upseting of the cap, the location of the view being indicated by the line 3—3 on Fig. 2.

In standard machines, four of these mandrels are employed, usually formed of wood, and these mandrels occupy the four positions or stations indicated on Fig. 2 being moved from station to station by means of timing mechanism not shown. Operated in synchronism with the mandrels is a shaft 11 which moves the cap feeding mechanism through an indexing gear 5 which is actuated by the rocker arm 6 which oscillates the pawl-carrying arm 7 which engages the ratchet 8 on gear 5 as shown in Fig. 1. The arm 6 is moved at regular intervals by a cam 10 driven from the shaft 11 near the base of the machine.

The main power shaft for the machine is a vertical shaft 12 which is shown in section in Fig. 2.

At the station A the mandrel 4 receives the squared-up container blank which is held in position by a spring detent 14 under which one of the flaps of the container is received. At the stations B and C the flaps which form the bottom closure of the container are glued and folded. At the station D the folded and glued container is ejected by being stripped downwardly off the mandrel by stripping fingers (not shown) which move in slots 15 formed in the sides of each mandrel.

The mechanism which has just been described is standard and further description is believed to be unnecessary. The parts and mechanisms which have been added or changed to incorporate the improvement will now be described. The container which has been shown is of the usual rectangular form and is designated by the reference letter E throughout the drawings. It is understood that the squared-up blank is telescoped upwardly on to each mandrel as it is at rest at station A, the upper flaps lying along the mandrel while the lower flaps project below the mandrel to be glued and folded at the stations B and C. To receive the cap, which is indicated as a whole by the letter G, one side wall of the carton is provided with the hole F which, in the illustrated case is set at one side of the wall so that the rim of the cap will project slightly over the edge of the completed container to provide a purchase by which the cap can be removed. The portion of the mandrel immediately above the location of the opening F is cut away to receive a pad 18 of rubber or other yielding material which will support the wall of the container but will yield sufficiently when the cap is upset to avoid splitting or cracking of the stock at this point. The manner in which this pad functions is shown in Fig. 9.

Set in the mandrel in a position in alignment with the opening F is a disk shaped anvil or block 20 to provide an impact surface against which the cap is upset. The outer face of the block is set inwardly sufficiently from the face of the mandrel so as to permit full seating of the cap when it is inserted in the opening F. This is shown in Fig. 7. The surface of the mandrel around the block is cut away as at 22 to allow for the inward flexing of the container wall when the cap is upset. The block is attached to a rod 21 which extends to a socket on the opposite side of the mandrel where it is held by a nut 23. The spacing of the outer face of the block 20 behind the outer wall of the mandrel is determined by the thickness of the stock, the depth of the depression in the surface of the cap and the amount to which it may be desired to upset or mushroom the cap. These factors will vary with different types of containers and caps but are readily determinable. From the cut away portion 22 to the lower edge of the mandrel a channel 24 is formed in the surface thereof to provide a space through which the bead of the cap G may move when the container is stripped from the mandrel at station D.

Before the cap enters the machine, the disk is formed so that the cap is provided with the central depressed portion $G^1$ the walls $G^2$ of which are usually at a slight taper. The outer rim of the cap $G^3$, is crimped by the operation which forms the cup or depressed portion and is of substantial width as shown, and in the particular form of closure so as to project beyond the side wall of the carton. When the cap is deformed the wall $G^2$ mushrooms to form the interlocking bead $G^4$.

Cap feeding mechanism

At the side of the machine adjacent the station B there is provided a rectangular framework 25 which supports the cap feeding mechanism. The caps enter the machine through a vertical guideway or chute formed of two oppositely positioned channels or rails 26 provided with grooves which receive the edge portion of each cap. Near the lower end of the chute a bridge piece 27 is mounted, which in conjunction with a vertical guide 28 set in the bridge piece prevents the caps from escaping from the chute.

The caps descend by gravity to a feeding device which moves them forwardly to the point at which they are transferred to and placed in position in the containers, but in order to insure the feeding of the caps in exact timed relation to the operation of the feeders and the transfer mechanism (to be described) an escapement wheel is located adjacent the lower or discharge end of the chute.

The escapement wheel is indicated as a whole by the numeral 30. It is driven by a shaft 31 mounted in bearings 32 supported by a portion of the frame 25. The rim of the wheel is provided with a series of pins 34 which enter the depressed portions of the caps as they move down the chute. In Fig. 4 a cap has just entered the transfer mechanism and a second cap just above the first mentioned cap is about to drop onto the transfer mechanism whereupon the cap immediately above will drop down onto the finger 34 where it will be suspended until the transfer device is ready to receive it. This insures that the caps will enter one-at-a-time into the transfer mechanism.

The shaft 31 is provided with the bevel driven pinion 38 which meshes with a drive pinion 39 mounted on the end of a shaft 40 supported in bearings 41 on the frame 25. The shaft 40 is driven by a gear 42 which meshes with a pinion 44 attached to the outer end of shaft 46 which constitutes one of the elements of the transfer device. A drive pinion 45 is attached to the shaft 46. The other element of the transfer device is the shaft 48 parallel with the shaft 46 and driven by a gear 47 of the same size as and in mesh with the pinion 45. A sprocket gear 50 is fixed to the end of the shaft 48. The shafts 46 and 48 are supported at the front of the machine in bearings 52 suspended from the underside of the frame 25 and at the delivery end of the shafts in bearings 54 formed on a plate 55 attached to an arm 25a forming a part of the frame.

The shafts 46 and 48 and the escape wheel 30 are driven in synchronism with the operation of the main container forming machine by a chain 58 passing over the sprocket 50 and over a second sprocket 59 mounted on a shaft 60 near the gear 5 and driven therefrom by a gear 61 on the shaft 60. In this manner the feeding of the caps is maintained in timed relation with the movement of the several mandrels.

The surfaces of the shafts 46 and 48 are provided with oppositely pitched screw threads 64 and 65 to provide spiral grooves in which the caps rest on their rims in upright position and by which they are moved step by step at each movement of the turntable 2. At the discharge end of the feed mechanism each cap falls into a delivery arm or rack indicated as a whole by the numeral 66. This rack is constituted by two vertical rails 67 having grooves 68 in which the rim of the cap will rest, the inner side of the rail at the rear face thereof being reduced so that the distance between the rails is slightly less at this point than the outer diameter of the cap. The lower ends of the grooves 68 are terminated by ledges 69 which support and hold the cap in position to be removed by the transfer device. It will be seen from Figs. 4 and 5 that the rear side of the cap is exposed between the rails and that the caps are fed so that the depression in the cap faces outwardly of the machine. The rack assembly is supported from the frame part 25a by an angular bracket 70.

In the position in which the foremost cap G is supported in the rack as shown in Figs. 4 and 4a it is in the path of the transfer device which moves the cap from the feed mechanism and places it in position in the hole in the side of the container which is on the mandrel in its B position.

The transfer mechanism is driven from the main shaft 12 of the machine by an eccentric 72 so that the transfer mechanism operates in the interval when the mandrels are stationary. The eccentric 72 is surrounded by the strap 73 from which is extended the link 74 which is adjustably connected at its outer end in a slot 75 formed in one end of a bell-crank lever 76 mounted on the lower end of a vertical shaft 78. The shaft 78 is mounted in bearings 79 in the frame 25 and 25a. The other arm of the bell crank lever is formed as a gear segment 81 which meshes with a gear 82 formed on the hub of a transfer arm 84. The arm 84 is fastened to the rotary shaft 85 which is parallel to the shaft 78 and mounted in bearings 86 on the frame.

The outermost position of the transfer arm 84 is shown in Fig. 5 where it is opposite and below the delivery rack 66. The outer end of arm 84 is split as shown in Fig. 5 to receive a hollow post 90 clamped in position by the bolt 91. The upper end of the post is enlarged to receive a transverse pin 92 which is preferably drive fitted into the head of post 90. The pin 92 has a central passage 93 which is in communication with the vertical passage leading from the base of the post 90. At its outer end the pin 92 is reduced and over the reduced end thereof is fitted a soft rubber suction cup 95 which, as shown in Fig. 5 is in direct alignment with and slightly smaller than the depression in the cap G. Behind the cup 95, the pin 92 is threaded to receive a rigid cup 97 which is somewhat larger than the cup 95 and of a size to fit against that portion of the rim of the cap G which is exposed in the rack.

When, therefore, the arm 84 is advanced, as shown by the arrows in Fig. 5, the suction cup, the outer edge of which is slightly forward of the rim of the rigid cup 97 will strike the base of the depression in the cap at about the same instant that the rim of the rigid cup 97 will strike the rim of the cap.

At the moment that the cup on the transfer arm meets the cap and until the cap is in position in the container wall at the end of the transfer stroke of the arm 84, suction is maintained on the interior of the cup 95 which holds the cap in position. This action is accomplished by attaching a flexible hose 99 to the base of the post 90 by a coupling 100. This hose extends to one side of a valve 102 mounted on the machine near the shaft 11. The other side of the valve is connected to a line 103 which leads to a source of vacuum. The valve is operated in timed relation to the movement of the transfer arm 84 so as to connect the suction cup with the source of vacuum during the transfer operation by an arm 104 attached to the valve and a link 105, the lower end of which is pivoted to an arm 106 mounted on the machine. A spring 107 tends to hold the valve closed and the arm 106 at its lowermost point which is adjustably fixed by the set screw 108. A cam roller 109 is located on the arm 106 in the path of a cam 110 mounted on the shaft 11 alongside the cam 10 which operates the gear 5. The cam 110 is so located and arranged that at the time the transfer arm is to start its movement toward the mandrel the valve 102 will be opened and will be held open long enough to permit the arm 84 to complete its transfer stroke which occurs during the dwell in the operation of the turntable 2. As soon as the cap is in position and before the transfer arm makes its return stroke the valve 102 is closed so that the cap remains in position in the container held by frictional engagement of the wall of the cap and the edge of the opening. It will also be noted that the timing of the cap transfer mechanism is such that the transfer arm 84 returns to its outermost position before the next cap is delivered by the screw shafts and drops into the rack 66.

*The cap upsetting mechanism*

After the container receives the cap, the mandrel is moved to position C where the cap is located opposite a plunger which advances toward the mandrel and delivers the upsetting blow while the mandrel is stationary. The plunger is carried on a shelf or platform 115 located on the side of the machine opposite to the cap feeding mechanism. The plunger which is indicated by the numeral 116 is a relatively heavy steel bar which is reciprocable in bearings 117 carried on the platform 115. The forward end of the plunger is formed with an enlarged head 118 which is slightly larger than the outer rim of the cap G. In the center of the head is a projection 120 which is somewhat smaller than the internal diameter of the depression in the cap and is designed to enter the cap and drive the base $G^1$ of the cap against the anvil 70, and hold it in position while the rim $G^3$ of the cap is forced inwardly by the outer rim of the head.

The depth of the projection is determined by the extent to which the wall $G^2$ of the cap is to be deformed to make the bead $G^4$. As shown in Fig. 9 the depth of the projection or extension 120 is approximately the same as the combined thickness of the stock which forms the wall of the container and thrice the thickness of the stock of the cap, the desired result being to form a pronounced bead about the interior of the cap so that an effective interlock will be provided between the cap and the wall of the container.

As shown in Fig. 9 the plunger passes beyond the plane of the outer surface of the container on its forward or upsetting stroke, this being necessary to upset the cap and also because of the spacing between the outer surface of the block 20 and the inner surface of the depression $G^1$ prior to the upsetting operation. Because of this fact the rubber pad 18 is provided which will permit the stock to bend as shown. The spacing around the other sides of the block 120 provided by the channel 24 and by the cut-away 22 permits the stock to yield in all other directions.

The plunger 116 is advanced and retracted at the proper time by a rocker arm 125, one end of which is pivoted at 126 to a bracket 127 mounted on the shelf 115. The other end of the rocker arm 125 is connected to the rear end of plunger 116 by a link 128.

The rocker arm is actuated by a pivotal connection with the stem 130 of a piston located in the cylinder 132 which is pivotally mounted on a bracket 134. Compressed air is admitted and exhausted from opposite ends of the cylinder to actuate the piston and reciprocate the plunger 116 through lines 135 and 136, which lead to one side of valves 137 and 138 respectively, located near the base of the machine and supported on a bracket 139. These valves are connected on the opposite sides to a source of compressed air and to exhaust ports as is standard practice.

The valves 137 and 138 are actuated to drive the piston to and fro by pivoted levers 141 and 142, which rest against valve operating pins, one of which is shown in Fig. 1 and designated by the numeral 143. Each lever 141 or 142 carries a roller 144 which is located in position to be actuated by one of the cams 145 or 146 located on a counter shaft 148 which is driven from the main shaft 12. The location of the cams and the speed of the shaft 148 are such that during the period when each mandrel is at rest at C-position, the valves 137 and 138 will be operated to drive the plunger forward to upset the cap and retract the plunger before the turntable moves the mandrels forward to the next position.

A modified form of upsetting mechanism is shown in Figs. 12 to 14, the essential difference between this form and the earlier form being that the anvil is moved outwardly to deform the protruding portion of the cap while the cap is held in position by the rim.

The interior of the mandrel is provided with a vertical bore 150 in the upper end of which is located a guiding sleeve 151 in which is slidably mounted a plunger 153, the lower end of which carries a cam member 154 for actuating the anvil 155.

Near the upper end of the mandrel, and well above the line of the upper container flaps is a transverse passage 158 which intersects the bore 150 and registers with a transverse opening 159 through the sleeve 151. At the side of the mandrel adjacent the opening is a bracket 160 on which is pivoted a rocker arm 162, the inner end of which is received in an opening 163 in the upper end of the plunger 153, the upper and lower surfaces of the opening being convexed to permit the movement of the arm 162 which raises and lowers the plunger. A spring 165, the ends of which are secured to the arm and the mandrel, holds the plunger 153 in a raised position, but permits it to be lowered to actuate the anvil in the manner to be described.

The anvil 155 which is located behind the opening that receives the cap G is provided with a stem 169 which is slidably mounted in a horizontal guiding sleeve 170 set in the mandrel and extending across the bore 150. This sleeve is apertured at 172 to receive the cam arm 154 which passes through an opening 173 across the stem 169. The rear portion of the stem is located in a socket 175 in the side of the mandrel and is threaded for lock-nuts 176. Between the nuts 176 and the base of the socket is the spring 178 which returns the anvil to its retracted position after the plunger has been raised.

In this modification the exterior plunger 180, similar to the plunger 116, is employed and operated in the same manner during the period that mandrels are stationary at the C-position. However, in this case the plunger 180 moves only to a point where it engages the rim G³ of the cap and holds it against the side of the container E while the anvil moves outwardly to upset the cap as shown in Fig. 14.

The anvil may be moved outwardly by means of a trip mechanism mounted at a convenient point, as for example on the shelf 182 attached in any manner to the machine frame. On the shelf 182 is located a bracket 184 in the upper end of which is a pivoted trip arm 185, the outer end of which lies below the end of the arm 162 on the mandrel as it is in the C-position. The other end of the trip lever is pivotally connected to the piston rod 188 of a reversely movable piston located in the pressure cylinder 189, pivoted at 190 to the shelf 182. Lines 191 and 191a lead from control valves (not shown) to opposite sides of the piston. The valves may be controlled by any suitable means such as additional cams on the same cam shaft which controls the operation of the valves which move the plunger 180.

In the sequence of operations after the mandrel carrying the container with the cap in place comes to rest at C-position, the plunger 180 advances to the position shown in Fig. 14 and remains in this position, holding the cap in the opening in the container while the arm 185 is moved to lift the rocker arm 162, driving the cam 154 downwardly and moving the anvil 155 outwardly to squeeze and deform the cap. The lowering of the trip arm 185 returns the parts to the position shown in Fig. 12 whereupon the plunger 180 recedes.

In this form of the upsetting mechanism the head of the plunger is not necessarily provided with a central projection to form a stop for the outward movement of the central portion of the cap, although one may be provided as shown by dotted lines in Fig. 14. In performing the operation of upsetting the cap by a blow delivered by a movable anvil located interiorly of the mandrel, it is not necessary to provide for inward movement of the container wall as in the earlier form.

*Resumé*

The new method of inserting closures of the type shown and described in the walls of a container is to place a closure which is formed from a disk of paper or similar deformable material, with a depressed central portion, in an opening provided for it in the wall of the container and then to mushroom that portion of the depression which lies behind the wall of the container. This may be done by pressure directed against the outer surface of the cap to drive and hold the cap against a rigid surface located within the container while permitting the wall of the container to flex inwardly as the rim of the cap is forced inwardly.

In the alternative, as shown in Figs. 12 to 14, the rim of the cap may be held against the side of the container while the cap is upset by pressure exerted against the rear surface of the cap.

The machine to carry out this operation automatically as described feeds the caps in succession to a position where the forward cap is picked up and inserted within the opening prepared for it in a wall of the container. The container is usually located on a mandrel which advances step by step through the container forming stations and the feeding mechanism is so located as to insert a cap in its position after the container is formed. The container carrying the cap in its original condition now moves to the station where the blow is delivered which deforms it sufficiently to form the interlocking bead.

While the application shows a specific form of mechanism for performing the method and carrying out the machine operations as set forth above, adapted to a particular type of container forming machine, the invention is not in any way limited to its application to that type of machine.

What is claimed is:

1. In a machine for producing containers having cup-like closures in separable interlocking relation with an opening in the wall of the container, a movable support on the machine, a mandrel carried by the support for holding a container, feed mechanism for advancing closures toward the mandrel, a transfer device for removing a closure from the feed mechanism and inserting it within the opening in the container while the mandrel is in one position, the mandrel being shiftable to a second position, a plunger in alignment with the closure in the second position of the mandrel, and means for moving the plunger against the closure, and an impact surface on the mandrel on which the closure is mushroomed by the plunger.

2. In a machine for producing containers having cup-like closures in separable interlocking relation with an opening in the wall of the container, a mandrel for holding a container, feed mechanism for advancing closures toward the mandrel, a transfer device for removing a closure from the feed mechanism and inserting it in the opening in a container while the container is located on the mandrel, a plunger, means for moving the plunger against the outer surface of the closure while it is in position in the container and an impact surface behind the closure against which the closure is upset by the movement of the plunger.

3. In a machine for producing containers having closures having a central depressed portion in separable interlocking relation with an opening in the wall of the container and a rim lying against the outer surface of the container, a mandrel for holding a container, feeding mechanism for advancing closures toward the mandrel, a transfer device to remove a closure from the feed device and insert it in the opening in a container while it is located on the mandrel, a plunger having an outer rim to fit against the outer rim of the closure and a projection to bear against the central portion of the closure, means for moving the plunger against the outer surface of the closure while it is in position in the container, and an anvil on the mandrel against which the central portion of the closure is upset by the inward movement of the plunger.

4. In combination with a container forming machine having a mandrel to support a container having an opening in a wall thereof, mechanism for delivering caps having a central depressed portion to a point adjacent the mandrel, a transfer arm having means to engage a cap as it is delivered by the said mechanism, means to move said transfer arm from the point where it engages the cap to insert the depressed portion of the cap in the opening in the container, and means to mushroom the depressed portion of the cap to form a bead thereon while the cap is in position in the container.

5. In combination with a container forming machine having a mandrel to support a container having an opening in a wall thereof, mechanism for delivering caps having a central depressed portion to a point adjacent the mandrel, a transfer arm having a suction cup to engage a cap as it is delivered by the said mechanism, means to move said transfer arm from the point where it engages the cap to insert the depressed portion of the cap in the opening in the container, a connection from said cup to a source of vacuum, means to maintain sub-atmospheric pressure in the cup during the movement of the transfer arm and to release said sub-atmospheric pressure after the cap is inserted, and means to mushroom the depressed portion of the cap to form a bead thereon while the cap is in position in the container.

6. In combination with a container forming machine having a mandrel to support a container having an opening in one wall thereof, a pair of rotatable shafts having spiral grooves thereon, means to deliver a cap to the shafts with the edge of the cap resting in said grooves, means to drive the shafts to advance the cap toward the mandrel, a transfer arm at the delivery end of the shafts, means on the arm to hold the cap, means to move the transfer arm to insert the cap in the opening, and means to release the cap after it is located in the opening.

7. In combination with a container forming machine having a mandrel to support a container having an opening in one wall thereof, a pair of rotatable shafts having spiral grooves thereon, means to deliver a cap to the shafts with the edge of the cap resting in said grooves, means to drive the shafts to advance the cap toward the mandrel, a transfer arm at the delivery end of the shafts, means on the arm to hold the cap, means to move the transfer arm to insert the cap in the opening, means to release the cap after it is located in the opening, an impact surface on the mandrel behind the opening, and a plunger movable toward and from the mandrel and operative to deform the cap against the impact surface while it is in position in the wall of the container.

8. In combination with a container forming machine having a mandrel to support a container having an opening in one wall thereof, a pair of rotatable shafts having spiral grooves thereon, means to deliver a cap to the shafts with the edge of the cap resting in said grooves, means to drive the shafts to advance the cap toward the mandrel, a transfer arm at the delivery end of the shafts, means on the arm to hold the cap, means to move the transfer arm to insert the cap in the opening, means to release the cap after it is located in the opening, and means to form a bead in that portion of the cap which is located in the opening in the container.

9. A machine for providing a container having an opening in a wall thereof with a separable cup-like closure interlocked with the container, a mandrel to support a container with the central portion of the closure projecting through the said opening, the surface of the mandrel having a channel leading to an end of the mandrel to receive the projecting portion of the closure, and means to squeeze the central portion of the closure while on said support to form an interlocking bead therefrom.

10. A machine for providing a container having an opening in a wall thereof with a separable cup-like closure interlocked with the container, a mandrel to support a container with the central portion of the closure projecting through the said opening, the surface of the mandrel having a channel leading to an end of the mandrel to receive the projecting portion of the closure, an anvil located inside of the container and a plunger located outside the container, said anvil and plunger being in alignment with the closure while the container is on the support, and means for causing the anvil and plunger to approach to a sufficient extent to mushroom the central portion of the closure.

DOUGLAS KIRK.

REFERENCES CITED

The following references are of record in the file of this patent:

UNITED STATES PATENTS

| Number | Name | Date |
|---|---|---|
| 1,030,300 | Hausheer | June 25, 1912 |
| 1,152,212 | Peppers | Aug. 31, 1915 |
| 2,220,135 | Wardell | Nov. 5, 1940 |
| 2,282,318 | Biggs | May 12, 1942 |
| 2,415,173 | Hulbert | Feb. 4, 1947 |

FOREIGN PATENTS

| Number | Country | Date |
|---|---|---|
| 12,262 | Great Britain | of 1887 |
| 211,671 | Great Britain | Feb. 28, 1924 |
| 217,797 | Great Britain | June 26, 1924 |